United States Patent Office 3,536,293
Patented Oct. 27, 1970

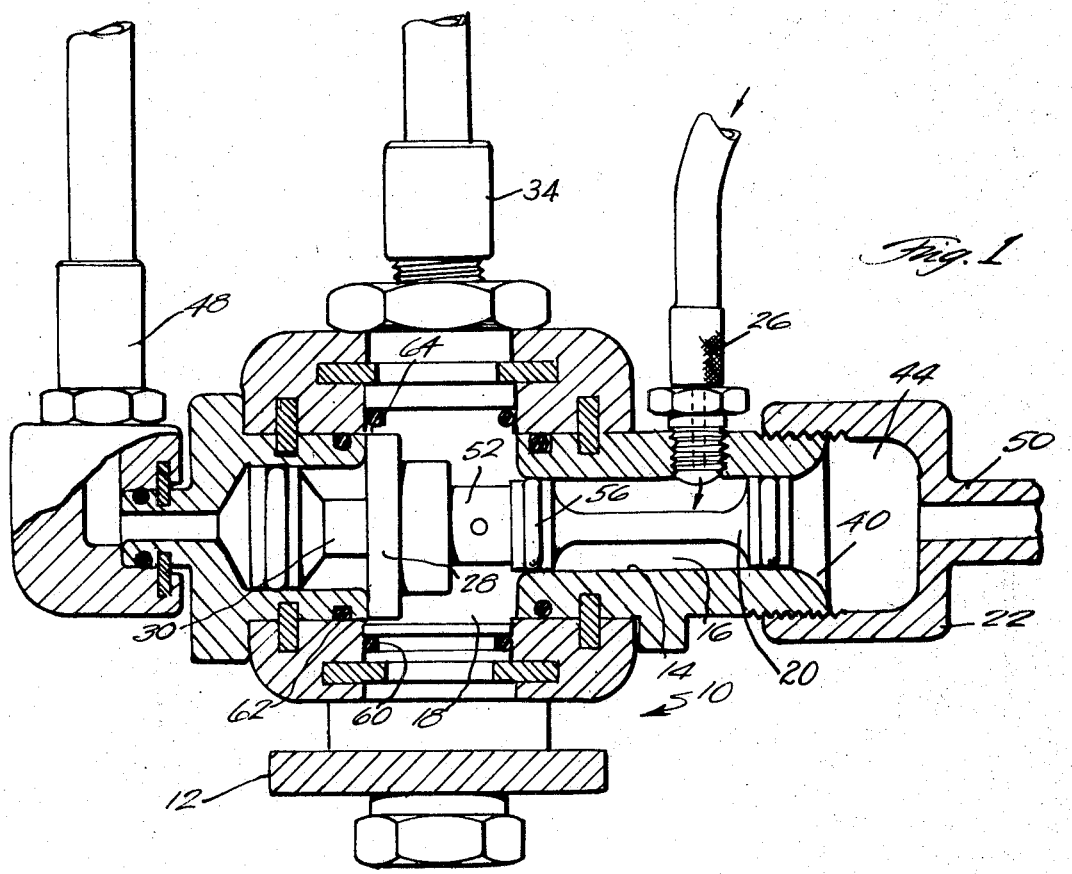

3,536,293
AIR ACTUATED FLUID VALVE
Glenn A. Burris, Mountain View, Calif., assignor of twenty percent each to Joseph A. Lares, Redwood City, and Albert J. Lares, Woodside, Calif.
Filed Oct. 10, 1968, Ser. No. 766,523
Int. Cl. F16k 23/00, 3/34
U.S. Cl. 251—31                                 1 Claim

ABSTRACT OF THE DISCLOSURE

An air operated fluid control valve for the controlled flow of glues, oils, syrups and other viscous fluids, in which improved fittings are provided for assembly of the valve and the spool assemblies therein. The spool assemblies move to the left or right as they may be influenced under air pressure. There is provided also a two-piece spool arrangement for providing multiple valves on a single stem.

---

The present invention relates to new and improved air actuated fluid valve construction, and more particularly relates to an improved two-piece spool construction for a valve member so that, under the influence of a spool component being closed, fluid may be sucked back, thereby counteracting the inertia of the fluid stream and resulting in an instantaneous cut-off of the material being controlled.

A further object of the present invention is to provide a high-speed, or millisecond cut-off, and in which the apparatus of the present invention accomplishes such ends.

The above and other objects and advantages of the invention will become apparent upon full consideration of the following detailed description and accompanying drawings, in which:

FIG. 1 shows a cut-away portion of the air actuated fluid valve according to a preferred embodiment of the present invention; and FIG. 2 shows a portion of a plan view thereof, according to the invention.

Referring now to the drawings, there is shown an air actuated valve and which may be mounted from a bracket or part of a machine to which the valve 10 is attached, the bracket or support means shown as means 12, and in which there is formed within the valve a valve chamber 14 having a small cylindrical section 16, and a larger cylindrical section 18. Within the small cylindrical portion there is a first small spool 20 within a chamber and valve body 22, and which is provided within the hub or ends of the spool of the spool means 20, a cavity 16 which is fed by fluid from a fitting 26 under any pressure necessary, and which is to be controlled by the air actuated fluid valve 10. Within the larger cavity 18, there is a hub 28 of a control spool 30 and which is joined to the smaller spool 20 in controlling relation for allowing the reliable operation within very poor alignment and extreme vibration conditions.

Due to the dimensions of the chamber 18, the spool 30 works in strict and precise transverse dimensions along the axial length of the cavity, whereas the spool 20 also has transverse or radial displacements due to the curvature of the orifice 40 formed about the smaller cavity 26 as it communicates with cavity 44. Thus, it is seen that the suck-back feature of the valve 10 caused by the displacement of the hub 28 of spool 30 due to air pressure acting upon the fitting 48 is sufficient to operate instantly and control the flow position of the fluid passing through fitting 26 into outlet 50. The suck-back feature refers to the introduction of pressure through fitting 48 and the evacuation of pressure from chamber 18 by means of fitting 34 in order to open section 16 to cavity 44, and it refers to the reversal of pressure (in other words, exhausting the pressure that was introduced through fitting 48 and introducing it through fitting 34) in order to suck spool 20 completely back into section 16 as the pressure forces hub 28 tightly against the stop on the left side of chamber 18 thereby closing valve 10. Thus, it is seen that the "off" movement from an "on" position of the valve 10 as controlled by the joinder means 28, 30, as well as junction 52 therebetween, operates on differential of the areas of the smaller and larger pistons, allowing a valve with both metered fluid and the air to be in the same housing separated only by one seal 56, and thereby necessitating only three seals to do the job throughout, including 60, 62, 64.

As has been described above, the spools 20 and 30 are connected by junction 52 with a roll pin 54.

Additional embodiments of the invention in this specification will occur to others and therefore, it is intended that the scope of the invention be limited only by the appended claim, and not by the embodiments described hereinabove. Accordingly, reference should be made to the following claim in determining the full scope of the invention.

What is claimed is:
1. An air actuated fluid valve, comprising:
   a valve housing having a first inlet, a second inlet, a third inlet, an outlet, and a chamber which said inlets and said outlet lead to and from respectively;
   a spool element slidably mounted within the inside circumference of said chamber at one end thereof, said spool element having one end thereof facing said first inlet and the other end thereof extending into an area of said chamber having a greater circumference than that of said chamber end;
   a hub connected at said other end of said spool element and having a greater diameter than said end of said spool element, said hub closing up said chamber end and separating said chamber end from said chamber area having a greater circumference;
   a junction element connected to said hub at one end thereof and extending to a second chamber area;
   a second spool element connected to said other end of said junction element and slidably mounted within the inside circumference of said second chamber area; and
   a seal mounted on the end of said second spool element connected to said junction element for separating said first chamber area from said second chamber area, said first inlet located in said chamber end, said second inlet being located in said first chamber area, said third inlet being located in said second chamber area between the ends of said second spool element, and said outlet being located at the other end of said chamber beyond the other ends of said second spool element, the inner circumference of said other chamber end being greater than the inner circumference of said second chamber area so that as air pressure is increased through said first inlet and said chamber end and is decreased in said first chamber area and said second inlet, said end of said first spool element will be forced away from said chamber end thereby pushing said hub away from said chamber end and thereby pushing said other end of said second spool element past the end of said second chamber area allowing fluid from said third inlet to flow unobstructed through said second chamber area and said other chamber end to said outlet, valve closure being achieved by reversing the pressure in said first and second inlets causing said end of said first spool element to be pushed back toward said chamber end thereby causing said other end of said second spool element to re-enter said second chamber area thereby preventing fluid passage between said second chamber area and said other end of said chamber, said hub resting against the stop formed at the opening between said first chamber and said second chamber thereby preventing said other end of said second spool element from coming to rest against and obstructing flow through the opening of said outlet.

References Cited

UNITED STATES PATENTS

| 1,334,612 | 3/1920 | Irving | 251—63.5 X |
| 2,783,020 | 2/1957 | Kleczek | 251—63.5 |

FOREIGN PATENTS

| 1,343,747 | 10/1963 | France. |
| 323,418 | 9/1957 | Switzerland. |
| 1,123,529 | 2/1962 | Germany. |

ARNOLD ROSENTHAL, Primary Examiner

U.S. Cl. X.R.

251—62